US010698413B2

(12) United States Patent
Lau et al.

(10) Patent No.: US 10,698,413 B2
(45) Date of Patent: Jun. 30, 2020

(54) APPARATUS, SYSTEM, AND METHOD FOR MOBILE ROBOT RELOCALIZATION

(71) Applicant: Savioke Inc., San Jose, CA (US)

(72) Inventors: Tessa Lau, Sunnyvale, CA (US); Christian Fritz, Menlo Park, CA (US); Philipp Herget, Sunnyvale, CA (US); Robert S. Bauer, Portola Valley, CA (US)

(73) Assignee: SAVIOKE INC., San Jose, CA (US)

( * ) Notice: Subject to any disclaimer, the term of this patent is extended or adjusted under 35 U.S.C. 154(b) by 0 days.

(21) Appl. No.: 15/856,277

(22) Filed: Dec. 28, 2017

(65) Prior Publication Data

US 2019/0204844 A1 Jul. 4, 2019

(51) Int. Cl.
G05D 1/02 (2020.01)
G05B 15/02 (2006.01)
G01C 21/20 (2006.01)

(52) U.S. Cl.
CPC ......... *G05D 1/0229* (2013.01); *G01C 21/206* (2013.01); *G05B 15/02* (2013.01); *G05D 1/027* (2013.01); *G05D 1/0248* (2013.01); *G05D 1/0274* (2013.01); *G05D 1/0276* (2013.01); *G05D 2201/0211* (2013.01); *Y10S 901/01* (2013.01); *Y10S 901/47* (2013.01)

(58) Field of Classification Search
CPC .... G01C 21/206; G05B 15/02; G05D 1/0248; G05D 1/027; G05D 1/0274; G05D 1/0229

See application file for complete search history.

(56) References Cited

U.S. PATENT DOCUMENTS

| 2005/0192707 | A1* | 9/2005 | Park | A47L 9/281 700/259 |
| 2008/0046125 | A1* | 2/2008 | Myeong | G05D 1/0219 700/253 |
| 2012/0089295 | A1* | 4/2012 | Ahn | G05D 1/0242 701/28 |
| 2012/0194644 | A1* | 8/2012 | Newcombe | G06T 7/74 348/46 |
| 2015/0088310 | A1* | 3/2015 | Pinter | G06F 19/3418 700/253 |
| 2019/0196497 | A1* | 6/2019 | Eoh | G05D 1/0274 |

OTHER PUBLICATIONS

D. Troniak et al., "Charlie Rides the Elevator—Integrating Vision, Navigation and Manipulation towards Multi-floor Robot Locomotion," 2013 International Conference on Computer and Robot Vision, Regina, SK, 2013, pp. 1-8. (Year: 2013).*

* cited by examiner

*Primary Examiner* — Tyler J Lee
(74) *Attorney, Agent, or Firm* — Patent Law Works LLP

(57) ABSTRACT

A mobile robot includes a mode of operation to recover from a localization error. The mobile robot detects a change in state in a local region proximate the mobile robot. The location of the mobile robot is identified based at least in part on the detected change in state. In one implementation, the mobile robot interfaces with a system controller of a building to initiate a change in state in a local region of a building.

21 Claims, 11 Drawing Sheets

APPARATUS, SYSTEM, AND METHOD FOR MOBILE ROBOT RELOCALIZATION

TECHNICAL FIELD

The present disclosure is generally related to mobile robot technology, including techniques for autonomous navigation of a robot in which the mobile robot includes a localization system.

BACKGROUND

Mobile robots used in building locations often navigate based on internal maps. For example, in a multi-story building the mobile robot may have a map for each floor to aid the robot in navigating through the building. The mobile robot may, for example, use on-board sensor data to determine its location on a map through a process called "localization."

However, localization can fail. When localization fails, it leads to a state of mislocalization in which the mobile robot cannot properly orient itself on its internal map. The localization process may fail for a variety of reasons. For example, a variety of unexpected events may create a mislocalization state. As one example, a human passerby may push a mobile robot out of an elevator onto an unexpected floor.

Conventional techniques for a robot to recover from mislocalization include a variety of manual techniques that are labor intensive. For example, onsite staff in a building can physically move a mobile robot to a known location in a building, such as moving the robot back to its docking station. However, this can be an onerous process in a large building site. Another option is to use trained operators to manually perform localization each time a robot is mislocalized. For example, a trained operator may manually relocalize a robot by comparing the robot's sensor data against known maps and through trial and error attempt to select the correct position of the robot on the map. This can be a difficult operation even for a trained operator if the sensor data of the robot is limited, there are multiple maps with similar features, or if there are identical features on a single map.

SUMMARY

An apparatus, system, and method is disclosed for a mobile robot to recover from a mislocalization state by detecting a change in state in a local region of a building. In some embodiments, the mobile robot detects the change in state proximate the mobile robot and then identifies the location of the mobile robot. In one embodiment, the mobile robot uses the detected change in state in the local region to narrow down the possible location of the mobile robot. In some embodiments, the mobile robot also stores additional detailed mapping or sensor data for at least some local regions as an additional aid to identifying the location of the mobile robot. The change in state may be initiated in different ways, including being initiated in response to a communication from the mobile robot.

In one embodiment, a method includes a mobile robot detecting a change in state, where the change in state is a change in state generated in a local region of a building. The mobile robot identifies a current location of the mobile robot based at least in part on the detected change in state.

One embodiment includes stationing a mobile robot in a local region of a building having at least one changeable state that is detectable by the mobile robot. A change in state is generated in at least one local region of the building. The change in state in some embodiments is generated in response to a communication from the mobile robot. The mobile robot detects the change in state. The location of the mobile robot is identified, based at least in part on the detected change in state. In some embodiments, the mobile robot communicates with a system controller of a building to initiate the change in state. In some embodiments, the mobile robot receives status information from the system controller. In one embodiment, the change in state is a change in state in an elevator. In other embodiments, the change in state is a change in an environmental state or an output of an electronic device.

In one embodiment, a mobile robot includes a relocalization system to recover from a localization error, the relocalization system being configured to detect a change in state in a region of a building and identify a current location of the mobile robot based at least in part on the detected change in state. The mobile robot may also include a communication system to issue a communication to initiate the change in state. In one embodiment, the mobile robot detects a change in a state of an elevator. In other embodiments, the change in state is a change in an environmental state or an output of an electronic device.

DETAILED DESCRIPTION

Figure 1:
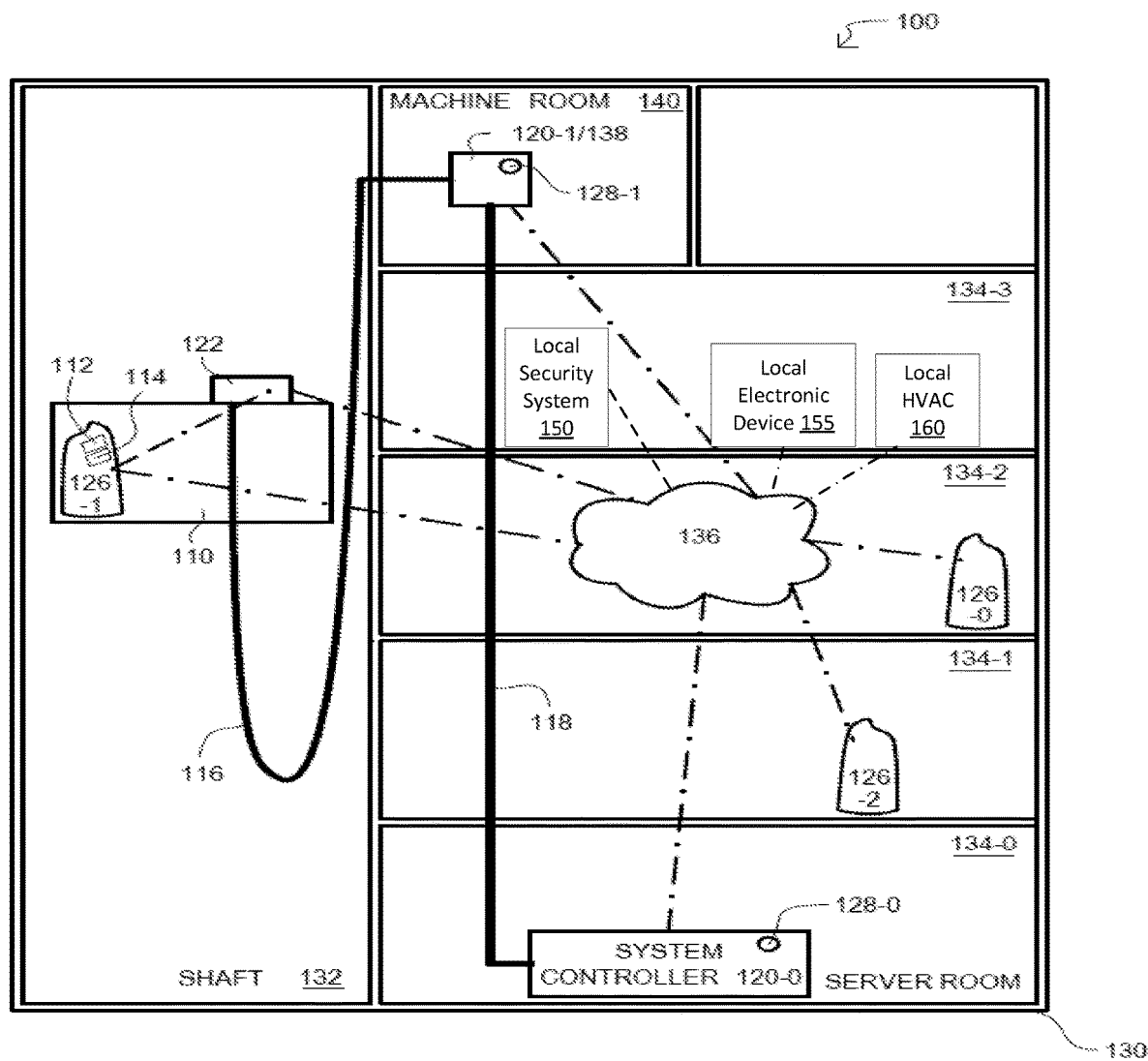
FIG. 1 illustrates an environment in which a mobile robot navigates through a building that may include one or more features that may be adjusted by a system controller, such as one or more elevators in accordance with an embodiment.

FIG. 1 illustrates a building environment in which a mobile robot 126 may navigate around a building facility 130 using an internal localization system, such as one based on comparing internal maps to on-board sensor data from sense systems 112, 114 of the robot where each sense system 112, 114 includes at least one sensor. In one embodiment, the mobile robot 126 has a mode of operation in which there is a communication with an external system controller 120 to change a state of a local region of the building. Additionally, in some embodiments, the external system controller also provides status signals on the status of local regions of the building.

In one embodiment, the mobile robot 126 communicates with the system controller 120 to initiate a change in a state of a local region of a building. However, in some embodiments, the communication is initiated manually, such as by a human operator initiating the communication with the system controller 120. Additionally, as described below in more detail, in some embodiments the change in state may be initiated in other ways. The mobile robot 126 then detects the change in state in the local region in a region proximate the mobile robot to acquire information to recover from a mislocalization state. In one embodiment, the change in state is detected by the sensors of the sense systems 112, 114 of the mobile robot. As illustrative but non-limiting examples, the change in state could include a change in a physical characteristic detectable by the sensors of the sense systems 112, 114, such as a change in state detectable as a change in an attribute, modulation, or pattern of light (or other electromagnetic radiation), sound, motion, vibration, or combinations thereof, etc.

In one embodiment, the change in state is a change in state of an elevator. For example, when an elevator opens its doors on a specific floor, the opening of the door can be detected by sensors such as by the movement of the doors, the change in optical appearance, depth sensors, and sound.

As illustrated in FIG. 1, a building may include one or more elevator cars 110. As described below in more detail, in some embodiments, the mobile robot 126 may communicate with a system controller 120 of the building to control aspects of the elevator operation. This may include the mobile robot 126 controlling the operation of an elevator car 110 by communicating with a system controller 120. In some embodiments, the mobile robot also receives elevator control status signals. An example list of common elevator control signals includes car call signals for calling an elevator, a door open signal to open the elevator door, a floor output signal for reading a current floor number of the elevator, a door limit switch signal for reading a door status, up and down, an output signal for reading the travel direction, and a fire (or alarm) signal. However, it will be understood that the extent to which a mobile robot may access a full or partial range of elevator status control signals may depend on implementation details as well as the design of the elevator.

As described below in more detail, in some embodiments the mobile robot 126 may also communicate with a system controller 120 of a building facility 130 to initiate a change in a state of local regions of a building that are not elevators.

For example, smart buildings permit environmental controls to be separately set in individual regions of a building as well as controlling electronic devices in individual regions of a building, such as turning on/off electronic devices in individual rooms, and controlling display screens or other electronic devices (e.g., televisions) in individual rooms. Many buildings also permit lighting systems to be controlled at a floor level or even a room level. This includes, in many cases, a capability to turn on, off, or adjust the intensity of lighting systems in different regions of a building. Additionally, some smart building systems are also capable of providing status information for local regions, such as the current status of environmental conditions or electronic devices.

Some security and safety systems also permit at least limited local control within a building of cameras, microphones, speakers, alarms, emergency exit signs, and emergency lighting. Not all buildings permit such security and safety systems to be externally controlled. However, in some cases some of the less sensitive portions of the safety and security systems may be accessible.

Referring again to FIG. 1, an individual floor of the building, such as floor 134-3, may have a variety of local features that can be controlled, via system controller 120, such as local heating, ventilation and air conditioning (HVAC) 160, local electronic devices 155, and in some cases one or more features of a local security/safety system 150.

FIG. 1 also shows aspects of elevator operation in a building facility. The overall facility, with controller and interfaces to control different features in the building can be considered to be a control system 100. In one embodiment, the control system 100 can include one or more mobile robots (126-0 to -2), a system controller (120-0 and/or 120-1), and one or more wireless communication links 136.

A building facility 130 may have one or more elevator cars 110 that traverse a car travel region 132 to arrive at different vertical locations 134-0 to -3. In some embodiments, a car travel region 132 can be an elevator shaft to arrive at different floors (e.g., 134-0 to -3)

The mobile robots (126-0 to -2) can move between different floors (e.g., 134-0 to -3) by use of elevator cars 110. In one embodiment, a robot (126-0 to -2) can include one or more sensors that enable it to determine its own vertical location. Consequently, when a robot (126-0 to -2) is near or within an elevator car 110 (or in an environment where wireless communication links are weak or otherwise not reliable), the robot can determine its vertical location without relying on a communication link with the system controller (120-0 and/or 120-1) or any other information source. In this way, a robot (126-0 to -2) can enter an elevator car 110, ride to a desired floor, and exit at the desired floor without necessarily having to be in communication with other components of the system 100.

The sensor systems of each mobile robot 126 may include a variety of sensors for determining altitude, optical sensors, vision sensors, acoustic sensors, depth sensors, accelerometers, motion sensors, sonar, LIDAR, etc. In some embodiments, additional sensors or sensor modes are devoted to collecting information on a change in state in a local region proximate the mobile robot, such as infrared sensors to detect infrared light or image recognition sensor to detect a pattern in a display screen, etc. The mobile robot may also have modes of operation in which it collects training data or otherwise stores data to create maps of a facility.

Robot Elevator Navigation Example

While robots according to various particular embodiments are described herein, in some embodiments a robot (126-0 to -2) can include a first sense system (one shown as 112 for robot 126-1). A first sense system 112 can determine at least a vertical location of a robot (126-0 to -2) when the robot is at a predetermined location (e.g., proximate to or within an elevator car 110). In addition or alternatively, a first sense system 112 can determine at least a vertical location of a robot (126-0 to -2) when one or more wireless communication links with a system 100 fall below a predetermined quality value. Still further, a robot (126-0 to -2) can continuously or intermittently determine a vertical location. A first sense system 112 can include one or more sensors that can generate values which can indicate the vertical location of a robot (126-0 to -2). Such sensors can include, but are not limited to, a barometer an accelerometer, or a vision system. According to embodiments, a first sense system 112 can operate independently of system controller 120-0/1, enabling a robot (126-0 to -2) to determine vertical location autonomously.

According to some embodiments, a first sense system 112 can generate values that enable a robot (126-0 to -2) to determine a vertical position of an elevator car in which it is riding. In a particular embodiment, a robot (126-0 to -2) can use an accelerometer to detect when an elevator car (in which the robot is located) has started to move (e.g., an acceleration event). A robot (126-0 to -2) can use such an acceleration event to take one or more first barometer readings. A robot (126-0 to -2) can then use the accelerometer to detect when the elevator car is slowing down to arrive at a new floor. A robot (126-0 to -2) can use such an acceleration event (e.g., deceleration) to take one or more second barometer readings. A difference in first and second barometer readings can be used to determine vertical travel distance. Vertical travel distance (which can be negative or positive) can be added to a starting floor location to determine the new floor.

In very particular embodiments, differential barometry can be used to determine what floor a robot (126-0 to -2) travels to every time the robot is transported to a new floor. Such a method can include identifying when an elevator trip has occurred, including identifying points in time that occur both before and after the elevator trip. The method can include collecting barometer readings from before and after the elevator trip using data from the first sensor system. The third step is to use the difference between the two barometer readings to determine what floor the robot (126-0 to -2) has moved to.

Identifying when an elevator trip has occurred can include any suitable method. In one particular embodiment, a first sense system 112 can include an accelerometer or other sensors that can measure the vertical acceleration of the robot. Using such sensors, a robot (126-0 to -2) can monitor an accelerometer to look for a characteristic acceleration that indicates the robot (126-0 to -2) is on an elevator car 110 and moving either up or down. For example, a common acceleration signature can be a constant amount of acceleration for a fixed period of time. Once this acceleration is identified, a robot (126-0 to -2) can determine the point in time at which an elevator trip started and can then wait for a similar acceleration in the opposite direction to identify the end of the trip.

Another way to determine when an elevator trip has occurred can be to use a barometer to identify periods where the pressure is changing at a particular rate corresponding to the velocity of car motion. From the signature barometer changes, a robot (126-0 to -2) can identify the start and end of a particular trip.

As an alternative to sensors being used to determine when a trip has occurred, information about the robot's trip could also be used to identify start and stop times. For example, the moment in time when the robot is standing in front of the elevator and requesting travel on the elevator car can be used as the start time, and the point in time when the elevator doors open could be used as the end time. As another alternative, a current time could be used as the end time to create a system that always knows what floor the robot is on, once the robot is expecting to be transported to another floor.

According to embodiments, collecting barometer readings can include determining barometric pressure both before and after the elevator trip are determined by keeping a log of barometric data and using data from the appropriate points in time corresponding to before and after the trip. This step can include taking an average over a certain time period both before and after the trip to get a more accurate reading.

Once the before and after pressures are determined, a robot (126-0 to -2) can use the pressure difference to estimate the new vertical floor position. Such estimation can use any suitable method, can include using knowledge of the pressure difference expected for traversal from the start floor to each of the end floors, and in one particular embodiment, can include checking which floor the new pressure reading is closest to. Additionally, statistical methods can be used by collecting data on all floor traversals and computing the maximum likelihood of being on a particular floor, as is known in the art.

As an alternative to barometric techniques, in another embodiment, the travel time can be used to determine the current floor the robot is on. In such an embodiment, a difference between the start and end times can be used to determine a total trip time. The trip time can be used directly with a lookup table of all the floor travel times to determine the correct floor. Alternatively, a distance between each floor can be used to estimate a travel time from the start floor to each of the possible destination floors. According to embodiments, the mechanical characteristics of the elevator system can be used to ensure accurate travel times.

According to embodiments, any or all of the above noted techniques can include the creation of a set of training data containing pressure and/or trip times for each of the floors. The training data can be generated in any suitable fashion, including but not limited to, being collected by a technician or installer that manually sends the elevator to a set of floors and records which floors the elevator went to. In addition or alternatively, if a wireless connection is good, a robot (126-0 to -2) can be placed in the elevator and the training data can be generated automatically by detecting both trip times and monitoring the position of the elevator using the wireless link to the elevator controller. The data collection can be accelerated by additionally placing floor requests into the elevator controller to collect the specific trips needed for the training data.

In some embodiments, a robot (126-0 to -2) can further include a second sense system (one shown as 114 for robot 126-1). A second sense system 114 can include any suitable sensor system for determining a status of an elevator car. These may include, but are not limited to, optical sensor systems for watching a floor display, optical or depth sensor systems for detecting the state of the car door, and/or audio sensor systems for listening for characteristic sounds made by the car on arrival at the floor.

In particular embodiments, based on sensed conditions, a robot (126-0 to -2) can dynamically switch between sense systems (112 and/or 114) and its wireless connection with an elevator system. As understood from above, while a robot (126-0 to -2) is not proximate to, or outside of an elevator car 110 and/or while the robot (126-0 to -2) has a sufficient wireless link with a system 100, the robot can rely on the wireless communication link to navigate to a location (e.g., destination elevator car). However, once a robot (126-0 to -2) determines its wireless link is not sufficient, it can switch to a first sense system 112 or second sense system 114 to acquire its vertical location.

As noted above, according to embodiments, a robot (126-0 to -2) can also switch to a first or second sense system (112/114) when it reaches a predetermined location (i.e., a location known to have poor wireless communication). As but two particular examples, a robot (126-0 to -2) can switch to a sense system (112/114) when it is proximate to, or inside an elevator car 110. Once the robot (126-0 to -2) departs from the predetermined location, it can end use of first or second sense systems (112/114). Of course, a robot (126-0 to -2) can switch between sense systems (112/114) based on other conditions, such as fire, power outage or other situations at a facility 130, as well as internal conditions, such a fault or reset of wireless communication systems of the robot. Further, as noted above, in other embodiments a robot may continuously or intermittently use first or second sense system (112/114) to determine vertical location.

In this way, a system 100 can provide for mobile robot operations that utilize an elevator system despite the fact that a wireless communication system may be unreliable in certain locations. In particular embodiments, wireless communication coverage can be worse inside an elevator car 110, especially when the elevator door is closed. To address this problem, a robot (126-0 to -2) can use a first sense system 112 to detect a vertical location of the elevator car 110 and thereby reduce the need for communications near the elevator region. The ability of a robot (126-0 to -2) to dynamically switch to a first sense system 112 can also be utilized in such environments.

In particular embodiments, robots (126-0 to -2) can be configured to acquire information needed via a wireless connection, and then travel via elevator cars 110 using a first sense system 112. As but a few examples, robots (126-0 to -3) can move to an area having sufficient wireless connectivity to allow communication with the system controller (120-0/1). For example, instead of attempting to communicate information near (or in) an elevator car, where a wireless connection may not be reliable, a robot (126-0 to -3) can move to a region with good wireless connectivity, transmit/receive communications, and only then return, or proceed, to the elevator car 110. By using such state sensors and communication behaviors, a system 110 can have more robust robot-elevator interactions. It also avoids having to add costly infrastructure or otherwise modify the building near the elevator cars 110 to improve connectivity.

According to some embodiments, a first or second sense system (112/114) can be "failover" systems for determining vertical location. That is, if a robot (126-0 to -3) loses its communication link with a system controller, or the like, it can switch to its a first or second sense system (112/114) to determine its vertical location (e.g., determine when it has arrived at the desired destination floor).

A system controller (120-0 and/or 120-1) can operate elevator cars 110 at a facility 130 to enable robots (126-0 to -2) to move between floors (e.g., 134-0 to -3). In some embodiments, a system controller (120-0 and/or 120-1) can monitor a status of elevator car 110 (and other elevator cars of the facility 130) and can control an elevator car 110 to move between floors (e.g., 134-0 to -3). A system controller (120-0 and/or 120-1) can generate control signals/commands to move elevator cars 110 in response to requests from various sources, including but not limited to requests from, or on behalf of a robot (126-0 to 3). A robot (126-0 to 3) can communicate with system controller (120-0 and/or 120-1) via a wireless link 136.

In some embodiments, a system controller can be a unit 120-1 that is part of, or is integrated with, site elevator control equipment. In such an embodiment, a system controller 120-1 can be located at the same location as typical or existing site elevator control equipment, such as a machine room 140. System controller 120-1 can be connected to an elevator car 110 by a first wired link 116. In such an arrangement, in response to a robot's current or future navigation route, or in response to requests made by the robot for elevator travel, a system controller 120-1 can operate elevator cars 110 to arrive at a floor (e.g., 134-0 to -3) to pick up a robot, then proceed directly, or indirectly, to a destination floor.

In other embodiments, the functions of system controller and site elevator control equipment can be distributed between two different locations. In one particular embodiment, a system controller can be a unit 120-0 located remotely from site elevator control equipment 138. In one embodiment, the system controller could be a cloud-based system that is in communication with the building elevator controller though a wired or wireless link. In the embodiment shown, system controller 120-1 can be located at one location (e.g., floor 134-0), while site elevator control equipment 138 can be located in machine room 140. System controller 120-0 can be connected to site elevator control equipment 138 by second wired link 118 and/or a wireless link 136. In such an arrangement, a system controller 120-0 can generate elevator control commands to site elevator control equipment 138 to enable elevator cars 110 to transport robots (126-0 to -2) between floors.

Still further, a system controller 120-0/1 can be split between two or more locations. For example, a system controller can include one portion 120-1 located proximate to elevator control equipment 138 and another portion 120-0 located elsewhere. System controller portion 120-1 can include items for controlling elevators for robot travel. Such an arrangement can eliminate the need for a wired connection like that shown as 118 (described in more detail below).

In particular embodiments, a system controller (120-0/1) can include one or more remote sensors (128-0 and/or -1). A remote sensor 128-0/1 can be located remotely from robots (126-0 to -2). A remote sensor 128-0/1 can be used to calibrate or otherwise adjust a reading from a first sense system 112 within a robot (126-0 to -2). As but one example, a first sense system 112 can include a first barometer, and a remote sensor 128-0/1 can be, or include, a second barometer. Because the second barometer can be at a fixed location (e.g., known floor) its reading can be used as a reference value for the first barometer of a mobile robot (126-0 to -2).

Optionally, a system 100 can further include an elevator control unit 122 local to an elevator car 110. Elevator control unit 122 can generate elevator control signals with operations equivalent to pushing a button of an elevator. In particular embodiments, elevator control unit 122 can be connected to a user input (pushbutton) panel of an elevator car 110. A robot (126-0 to -2) can communicate with an elevator control unit 122 directly, or by way of a wireless link 136. In a very particular embodiment, a robot (126-0 to -2) can communicate with a server that is part of link 136, which can then be communication with a system controller 120-0/1.

In some embodiments, a system 100 can be installed at a facility 130 having existing site elevator control equipment 138. In such cases, such an installation can be at relatively low cost, as robots (126-0 to -2) can utilize an existing wireless communication system (e.g., 136 which can include larger networks, including the internet) available at the facility to communicate with system controller (120-0/1). In addition, in embodiments where a system controller 120-0 is located remotely from site elevator control equipment 138, the system controller 120-0 can communicate with the site elevator control equipment 138 by way of the existing wireless communication system. However, as understood from above, a system controller 120-0 could be connected to site elevator control equipment 138 by a wired connection (e.g., 118).

In a very particular embodiment, any of wired links 116/118 can include a suitable wired connection for the desired quality of communication of the operating environment. In particular embodiments, any such wired links 116/118 can include a serial communications link, including but not limited to, links according to the RS-485 standard or IEEE 803.2 standard (e.g., Ethernet). A wireless link 136 can be any suitable wireless connection, including those according to standards such as IEEE 802.11 (i.e., WiFi), the Internet, Bluetooth, or cellular network (e.g., 3G, 4G/LTE), as but a few of the many possible examples. A wireless link 136 can be omnidirectional and connect to another pre-existing building network, or it can be a directional point to point connection to an intermediary device at appropriate locations.

Mobile Robot Example

Figure 2:
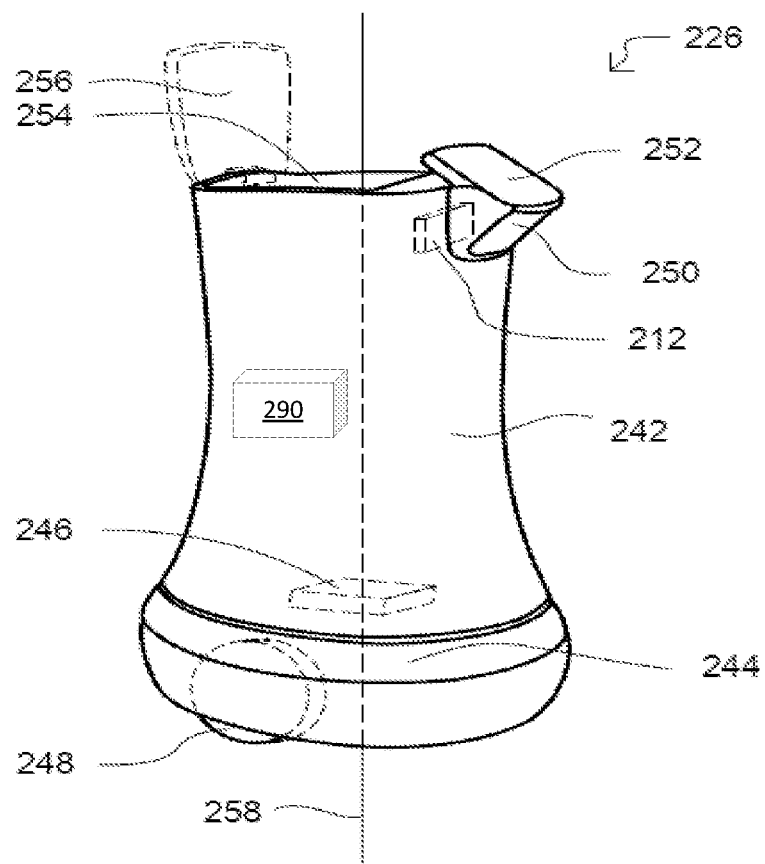
FIG. 2 is a perspective view of a mobile robot in accordance with an embodiment.

Referring to FIG. 2, a mobile robot 226 according to an embodiment is shown in a perspective view, showing in more detail some aspects of an embodiment of mobile robot 126. In one embodiment, mobile robot 226 may include a navigation system 290 that may be implemented using hardware, firmware, processors, memory, and software to support a localization system including one or more internal maps. As previously discussed the internal maps may be generated via training or other techniques. In one embodiment, the mobile robot 226 supports a relocalization state to recover from a localization error, as will be described below in more detail.

The mobile robot 226 can include a body 242, movement system 244, control system 246, and a first sense system 212. A body 242 can house all, or a majority of, the components of robot 226. In some embodiments, a body 242 can have a generally cylindrical shape about a vertical midline 258.

A movement system 244 (understood to be within body 242) can enable the robot 226 to travel to various destinations, including between floors of a multi-story building by riding within elevator cars. Elevators cars can be those cars used for people at the location, or can be other elevator cars, such as service elevator cars, or an elevator designed for robots or other machines. In the embodiment shown, a robot 226 can include two opposing wheels (one shown as 248), as well as a third smaller wheel (not shown) toward the rear of the robot 226. However, alternate embodiments can include any other suitable movement system, including those with fewer or greater numbers of wheels, or other movement systems, such as those that use tracks.

A control system 246 can control operations of a robot 226, including moving the robot 226 between desired locations in response to requests. A control system 246 can be located within a body 242. While FIG. 2 shows control system 246 at a particular location within body 242, alternate embodiments can position a control system 246 at any suitable position in or on the robot 226.

A first sense system 212 can include one or more sensors for determining at least a vertical location of the robot 226. In some embodiments, a first sense system 212 can include a barometer which can measure barometric pressure. This value can be used by the first sense system 212 and/or the control system 246 to determine a vertical location of the robot 226. In some embodiments, barometric pressure data can be processed to determine a floor number by examining the differential pressure when a floor traversal occurs. It can also be compared to a reference barometer located inside or near the building to identify the absolute height and thereby determine a floor number.

In addition to or alternatively, a first sense system 212 can include an accelerometer. As but two examples, an accelerometer can be used to detect vertical motion and determine a floor number by calculating distance moved and/or calculating a time travelled under acceleration. However, embodiments can include any other suitable data analysis to determine a floor number based on acceleration.

In some embodiments, a robot 226 can include additional systems for detecting a vertical location of the robot. Such systems can be part of the first sense system 212, or can be part of other systems of the robot 226. As but one example, a robot 226 can include one or more image systems which can detect floor indicators already present in an elevator car (e.g., lighted buttons in a panel, a lit floor number on a panel of floor numbers, etc.). Such data can be used alone, or in conjunction with the sensor of a first sense system 212. As but a few very particular examples, if an imaging system can determine a floor number, a robot 226 can use such a determination to confirm a value provided by a sensor; if an imaging system cannot determine a floor number (e.g., its view is blocked), a first sense system 212 can use its sensor to determine floor number. Alternatively, such additional systems can form part of another sense system (e.g., 114 of FIG. 1).

In some embodiments, a robot 226 can include additional sensors for traveling within elevator cars between floors. For example, a robot 226 can include one or more door sensors for discerning an open/closed state of an elevator car door. Door sensors can be part of a first sense system 212, or can be components of another system. Door sensors can include, but are not limited to, optical or imaging techniques based on depth cameras, video cameras, still photos, or laser range finders. Alternatively, door sensors can include ultrasonic or radar ranging devices. Still further, door sensors can also include audio sensors, which can detect one or more distinctive sounds indicating an opening or closing of an elevator car door. Such distinctive sounds can include, but are not limited to, mechanical door sounds or sounds produced by the elevator systems, such as chimes to announce the arrival of an elevator car. In other embodiments, a robot 226 can sense a state of an elevator door by sensing door mounted beacons or tags, or changes in detected intensity of a signal emitted from inside the elevator car (e.g., infrared light intensity, RF signal, etc.). Door sensors can be used to notify a robot 226 when an elevator car has arrived at a floor, without the need for a reliable wireless connection with a system controller (e.g., 120-0/1 in FIG. 1), or the like. Such additional sensors can form part of another sense system (e.g., 114 of FIG. 1).

While FIG. 2 shows first sense system 212 at a particular location on robot 226, alternate embodiments can position a first sense system 212 at any suitable position in or on the robot 226.

Referring still to FIG. 2, a robot 226 can also include a navigation sensor system 250. A navigation sensor system 250 can include sensors to enable a robot to autonomously navigate a path between locations, and can include any suitable navigation sensors, including but not limited to video and/or still optical sensors (in visible and/or non-visible spectra), sonar sensors, radar sensors, or laser range finders. Such sensors can be used to provide a floor determination in addition to that provided by a first sense system 212, as noted above. As but one very particular example, a first sense system 212 can include a barometer for determining altitude, or an accelerometer for determining vertical motion, while a navigation sensor system 250 can task one or more of its image sensors to attempt to read floor indicators when inside of an elevator car and/or proximate an elevator car.

Optionally, a robot 226 can also include an interface (I/F) 252. An I/F 252 can enable a robot 226 to be directed or programmed to perform various tasks and/or to interact with other people. In a particular embodiment, an I/F 252 can include a touch screen I/F for a low profile. According to particular embodiments, a robot 226 can be a delivery robot and an I/F 226 can be used to authenticate delivery to an indicated destination and/or person.

A robot 226 can optionally include a securable container 254. A securable container 254 can be located within a body 242, and in some embodiments, can be positioned at the top, or proximate to the top of the robot 226. In a particular embodiment, a securable container 254 can include a securable lid 256 which can be locked and then released when an authentication procedure has been completed by the robot 226, or by the robot 226 in conjunction with a person.

The control system 246 can include one or more processors executing stored instructions that can be responsive to sensor inputs and/or transmitted inputs to navigate the robot between locations, including by riding elevator cars between different vertical locations. In a particular embodiment, a control system 246 can include an x86 or similar central processing unit. A control system 246 can also operate in conjunction with one or more microcontrollers and/or motor controllers for local control of robot 226.

In some embodiments, the navigation sensors of the robot can include any of: a video camera, a forward-looking depth sensor, or a downward looking depth sensor. A video camera can acquire imaging data for processing by the robot to recognize locations/landmarks to navigate a facility. In very particular embodiments, a video camera can be an RGB CMOS type video camera. In particular embodiments, each depth sensor can include a beam emitting device and an image sensor that detects the beam as it reflects off of objects. In a very particular embodiment, depth sensors can include an IR emitter and IR image sensor, such as an IR video camera.

In addition to navigation sensors, a robot 226 can include one or more other sensors, such as a wide-angle sonar device and a sonar array.

Power for the various systems of robot can be provided by batteries. A drive mechanism can include separate drive motors, each attached to its own wheel, in a differential drive configuration.

Interaction of Mobile Robot with System Controller

Figure 3:
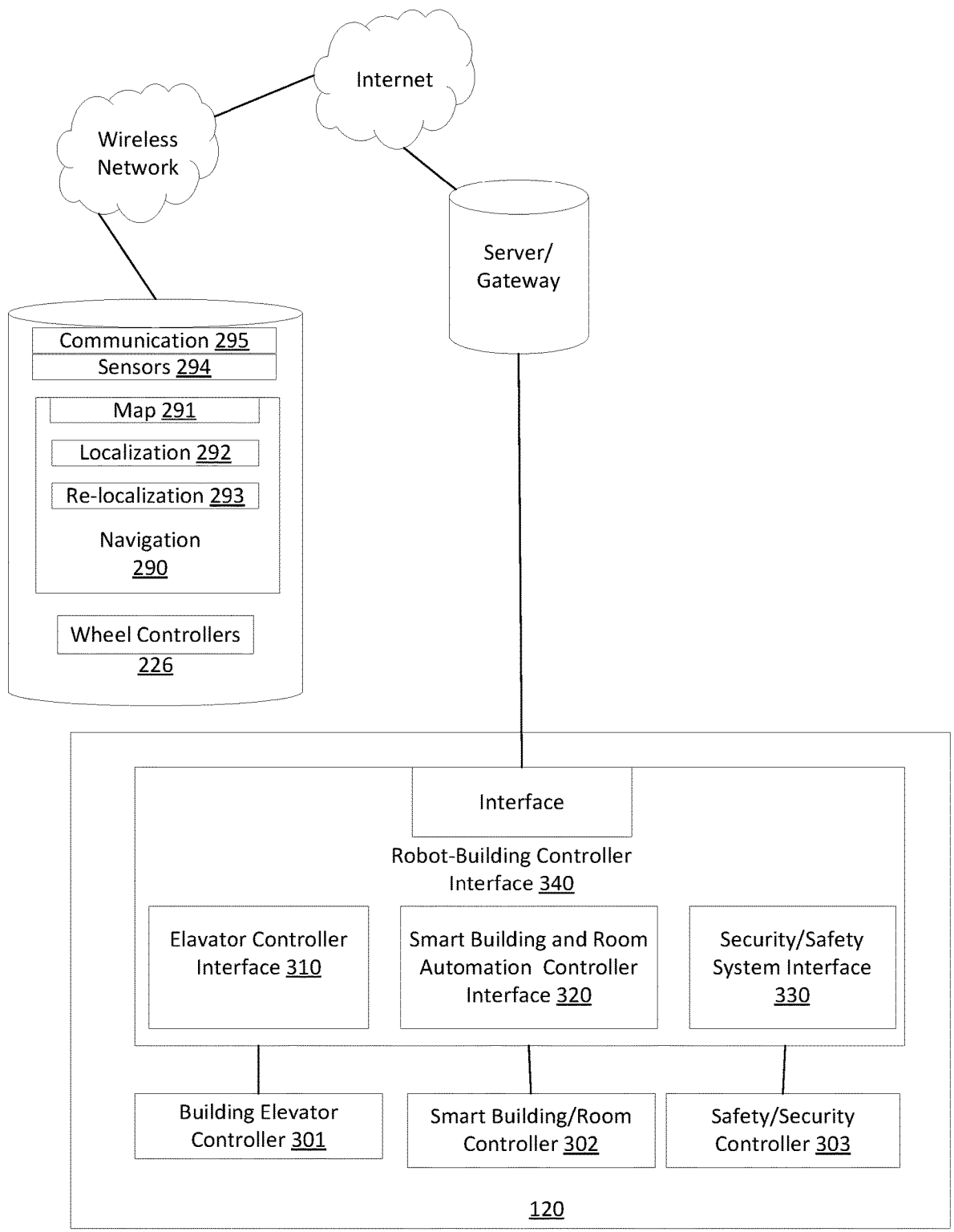
FIG. 3 is a diagram illustrating a mobile robot communicating with a controller interface to change a state within a local region of the building.

FIG. 3 illustrates in more detail some aspects of the system controller 120 in accordance with an embodiment. In one embodiment, the system controller 120 is implemented as a building controller interface 340 having a set of interfaces that access the local building controllers, such as interfaces 310, 320, and 330 to interface with a building elevator controller 301, smart building controller 302, and any accessible features of a security/safety controller 303.

In one embodiment, the mobile robot 226 uses a wireless connection to access a building controller interface 340. As examples, this could be achieved with a local wireless connection, building Wi-Fi connection, or local data connection. Alternatively, in some embodiments, a wireless connection may be first made to a server/gateway, acting as an intermediary, which then supports a wired communication with the building interface controller.

FIG. 3 also illustrates in more detail some aspects of navigation system 290, which for the purposes of illustration is illustrated as a single unit although its components may be distributed. In one embodiment it may include a localization system 292, maps 291 for the localization system 292, and a relocalization system 293 to recover from a localization error. The localization system 292, maps 291, and relocalization system 293 may be implemented in hardware as a microcontroller with firmware or software. The sensors 294 can include any of the previously mentioned sensor or sensors specially adapted for performing relocalization by detecting a change in state in a local region of a building. Additionally, the sensors could be specifically selected to detect a particular change in state in a local region of a building. For example, the change in state could be a change in a level of infrared light that is imperceptible to the human eye but detectable with an infrared optical sensor on the mobile robot. As another example, the change in state could be a change in an audio signal outside of the normal range of human hearing but detectable via a microphone on the mobile robot. As still yet another example, the change in state could be an optical or acoustic pattern that encodes information that is imperceptible to the nervous system of an unaided human being but detectable with appropriates sensors and pattern matching by the mobile robot. As another example, a change in a fan speed of an environment system could encode information that to a human observer might appear to the unaided human ear to be ordinary background cycling of a heating and cooling system.

In some embodiments, the mobile robot 226 communicates with system controller 120 to initiate a change in state of a local region of the building. The communication unit 295 in the mobile robot to perform this may be based on the previously described examples or be an additional custom unit.

Methods of Operation

Figure 4:
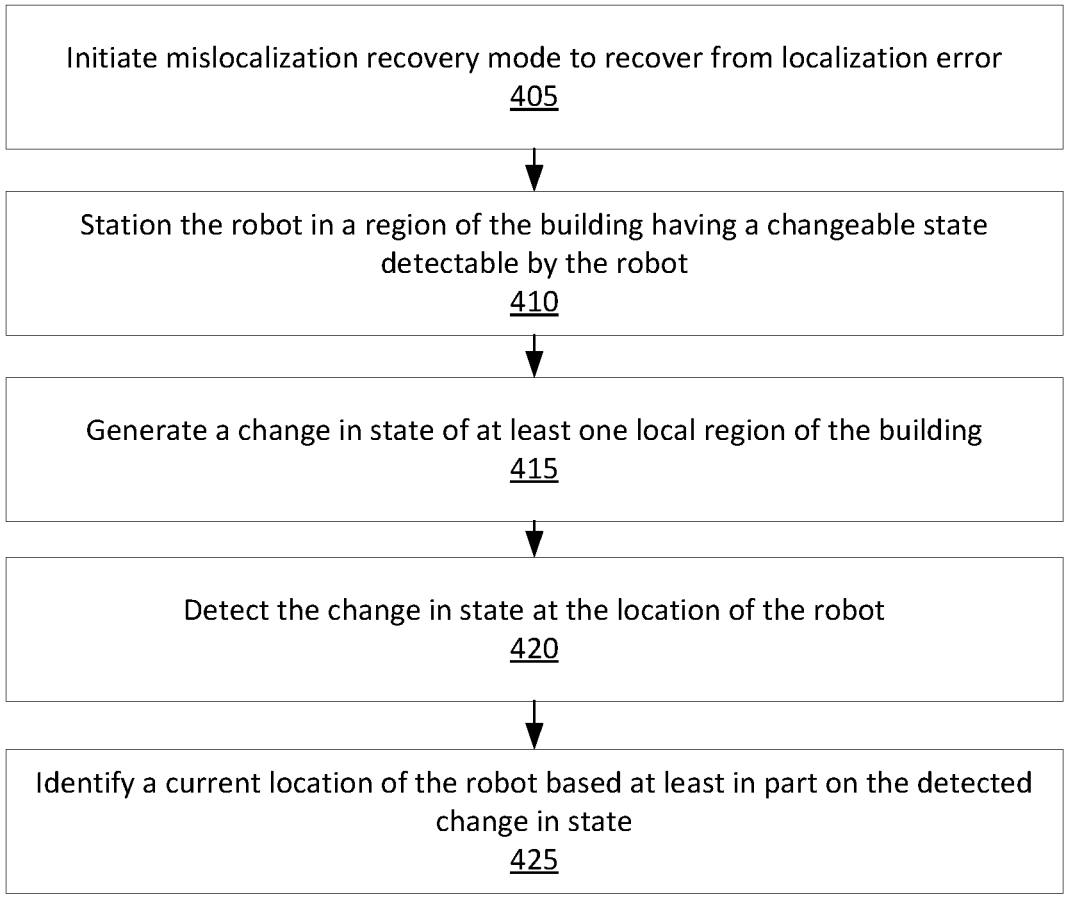
FIG. 4 is a flow chart of a general method of recovering from a mislocalization error of a mobile robot by initiating a change in state in a local region of the building in accordance with an embodiment.

FIG. 4 is a flowchart showing a general method of recovering from a localization error in accordance with an embodiment. In block 405 a mislocalization recovery mode is initiated to recover from a localization error.

In some embodiments, the mobile robot 226 detects a localization error and initiates a mislocalization recovery mode. However, in some embodiments, a human user initiates the recovery mode manually or as a teleoperator. As another example, the mobile robot could include a button, control input, or wireless control feature to permit a human user to initiate the recovery mode. In some embodiments, the mobile robot could also generate a signal, alarm, or visual display to indicate that it has experienced a localization error. In still other embodiments, a remote teleoperator initiates the localization recovery mode.

As illustrated in block 410, in one embodiment, the mobile robot is stationed in a region of the building having a changeable state detectable by the robot. However, it will be understood that stationing the robot in particular stationing sites may not necessarily always be necessary in all situations, such as in situations in which the current location of the mobile robot is limited to locations that are equally useful in regards to determining the location of the robot by detecting a changing a state in local regions of the building.

In one embodiment, the mobile robot autonomously stations itself in a suitable stationing location. For example, even if the mobile robot does not know exactly where it is, it may still be able in some cases to identify individual landmarks and features. For example, elevator doors maybe recognizable even if the robot does not know what floor it is on. In some buildings, some types of rooms have highly recognizable features on each floor of a building. For example, some office layouts have bathrooms located at the same relative location on each floor of the building.

In some embodiments, a human operator guides or pushes the mobile robot to a stationing point. This could be done manually. For example, in a hotel a human being could guide (or push) the mobile robot to a stationing point. Alternatively, in some embodiments, a remote teleoperator could guide the mobile robot to a stationing point. For example, the stationing point could be a point outside an elevator door, a point inside an empty room, a point inside an empty conference room, etc.

In block 415, a change in state is generated in at least one local region of the building. In one embodiment, a communication is initiated with at least one building controller (of the system controller 120) to initiate a change in state of at least one local region of the building. In one embodiment, the mobile robot initiates the communication using, for example, a wireless connection. However, in some embodiments, a human operator initiates the communication with the system controller 120.

In some embodiments, a human user enters an input, such as pressing a button on the robot, as a condition for the robot 226 to communicate with the system controller 130 and initiate a change in state. However, in some embodiments, the mobile robot 226 performs this automatically after it has reached a stationing point.

Additionally, in some embodiments, the change in state could be generated via manual inputs entered by a human being entered using the control features of the building. For example, the mobile robot could generate a user interface instructing a human being to press buttons on an elevator to change an elevator state. Thus, the mobile robot could indirectly initiate the change in state. However, in some embodiments, the change in state could be initiated on behalf of the robot, such as for example a trained human user pressing buttons on an elevator to change the state of the elevator on behalf of the mobile robot.

As previously discussed, some examples of a change in state include a change in state of an elevator, a change in state of an environmental condition (e.g., HVAC conditions, such as temperature, fan speed, etc.), lighting conditions in local regions (e.g., lights on/off, lighting intensity, modulation of light output, etc.), a change in an output of a local electronic device (e.g., light output from an electronic display, computer screen, projector, or television; audio output from an electronic device including telephones, intercoms, computers, and televisions); or a change in state of one or more security or safety features, such as a change or modulation in a lighting level of emergency lighting, exit signs, and alarms; or a change in state of a security system associated with the security system detecting the presence of the mobile robot at a particular location (e.g., the mobile robot appearing in a video shot taken by a security camera).

In some embodiments, the change in state may be observable to a human observer, such as a change in state of an elevator or using a HVAC system to create a change in temperature. However, it will be understood that in some embodiments the change in state may be designed to be largely imperceptible to a human observer. For example, in some cases, lighting systems permit visible light output to be modulated fast enough for the modulation to be effectively un-recognizable by the naked human eye. Some security systems are designed to be capable of generating infrared light that is beyond the range of human vision. There are also some wavelengths of sound beyond human hearing. Additionally, some patterns can be recognized by machines but are largely or completely unrecognizable by human beings. For example, a display screen may be used to generate an output of pixels that has an embedded code that is difficult or impossible for human beings to observe. The embedded code may, for example, be spread over the display screen in a manner in which it is effectively impossible for a human observer to identify at any normal viewing distance but in which there is a code embedded as a pattern in the pixels. Similarly, some variations in a HVAC system, such as modulating a fan speed, may be used to embed a simple code which may be difficult for a human observer to recognize.

In block 420, the mobile robot detects the change in state at a location proximate the mobile robot. As previously discussed, the mobile robot may use its own sensors to perform the detection, as well as any external sensors that the mobile robot has access to. Additionally, the detection of the change in state may include pattern recognition to map the sensor data to a data pattern associated with a particular change in state. For example, if the change in state is a modulation of visible light from room lights, then in one embodiment the detection includes identifying a pattern of light modulation and any coded information associated with the light modulation (e.g., floor level or room number).

In block 425, the mobile robot identifies a current location of the robot based at least in part on the detected change in state. For example, if the robot identifies a floor level from the change in state, then this information can be used to narrow down the location of the robot particularly if the robot is near some other landmark features that help to narrow down a location at the floor level.

In a smart building implementation, some environmental controls may be remotely adjusted on a floor-by-floor basis and even a room-by-room basis. Thus, detecting a change in state in a particular room significantly narrows down the location of the mobile robot, particularly if the robot is stationed at a highly identifiable feature within the room, such as proximate a door or a window.

Additionally, in one embodiment the mobile robot also maintains detailed map or sensor data files for at least some selected stationing sites. For example, if the robot is stationed at a particular stationing site (e.g., near an elevator), then detailed maps or sensor data logs of a local region proximate the stationing site may be used as an additional source of information in a final identification of the location of the mobile robot.

Figure 5:
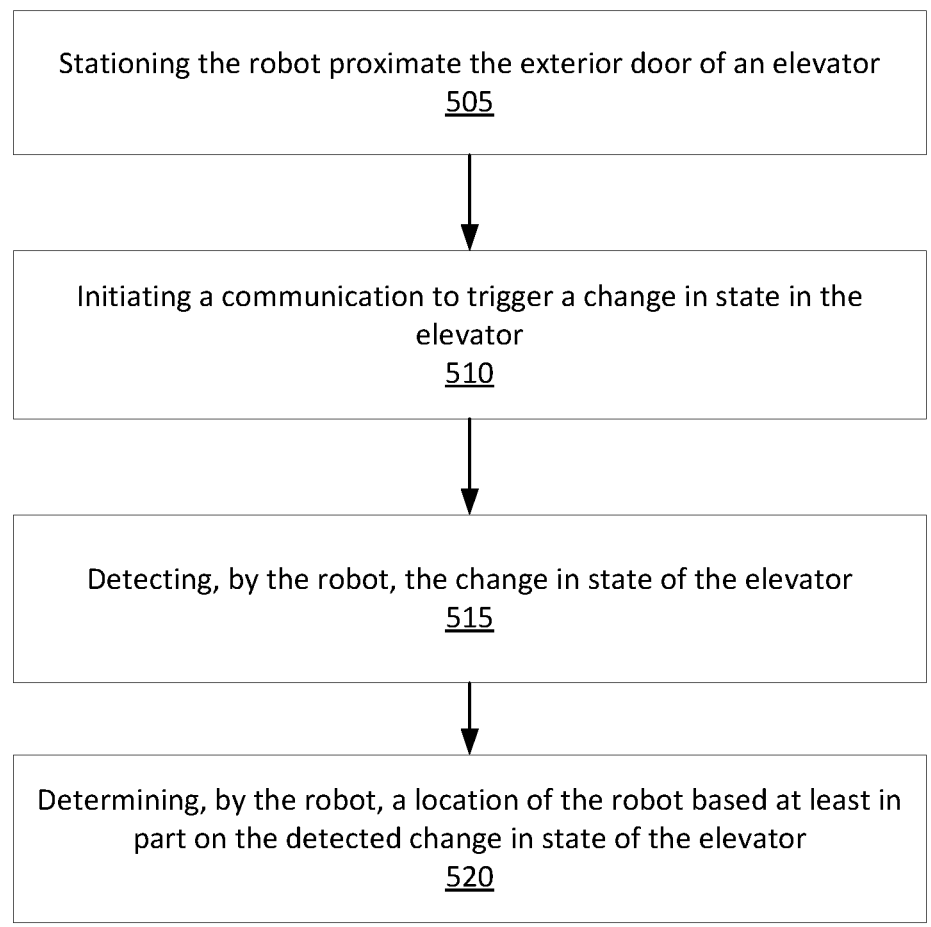
FIG. 5 is a flow chart of a general method of recovering from a mislocalization error of a mobile robot by initiating a change in state of an elevator in accordance with an embodiment.

FIG. 5 is a flowchart of a general method of recovering from a localization error by detecting a change in state of an elevator. In block 505, the mobile robot is stationed proximate the exterior doors of an elevator. As previously discussed, the stationing may be performed by the mobile robot, by a human operator manually stationing the mobile robot by moving or guiding the robot, or by a human teleoperator.

In block 510, a communication is initiated to trigger a change in state of the elevator. For example, a human operator could press a button to trigger the communication, a teleoperator could initiate the communication, or the mobile robot could automatically initiate communication with the system controller 120.

The change in state of the elevator could include a variety of possibilities. In one embodiment, the elevator car is commanded to move to a selected floor such that the change in state is a change in floor level of the elevator. Alternatively, the change in state could include a movement of the elevator car over a sequence of floors.

However, there are other possibilities for the change in state of the elevator. This includes a change of state in which the elevator remains stationary. For example, in some embodiments, the system controller could ring the elevator alarm in the elevator car. For example, if the elevator happened to be on the same floor as the mobile robot (but with the elevator doors closed) then ringing the elevator alarm may still be detectable by the mobile robot even if the elevator does not change floor. Similarly, if the elevator car happened to be on the same floor as the mobile robot (but with the elevator doors closed), opening the elevator doors would be detectable by the mobile robot even though the elevator car does not change floors.

The change in state of the elevator may also include noise and vibration associated with movement of the elevator. For example, in some elevator designs the noise and vibration outside a closed elevator door varies depending on whether the elevator car is moving up or down. The noise and vibration of a moving elevator car also depends on other factors related to the cables, counterweights, and airflow in the elevator shaft. That is, a change in state of an elevator could include local changes to noise and vibration associated with the movement of the elevator car. In some cases, the noise and vibration of an elevator car is sufficient to at least narrow down possible locations for the mobile robot. For example, if the noise and vibration indicate that the elevator was moving up with respect to the mobile robot then this indicates that the mobile robot is on a lower floor than the destination floor of the elevator. Other changes to the elevator noise and vibration may, in some cases, further narrow the choices.

In block 515, the mobile robot detects the change in state of the elevator. As examples, the robot may use its sensors to detect movement of the elevator or the opening of the elevator door. For example, the opening of the elevator doors may be detected by the mobile robot based on any of the previously described techniques, including optical techniques, motion detectors, acoustic, sonar, etc.

This information may be used in some embodiments to identify the exact floor the mobile robot is located on, such as when the elevator door opens proximate the robot.

In block 520, the robot determines its location based at least in part on the detected change in state of the elevator. As previously discussed, in one embodiment this includes determining the current floor the robot is on and using this information to aid in identifying the location of the mobile robot with respect to an internal map of the robot. In some embodiments, this may also include using detailed map or sensor data for regions outside the elevator doors in order to narrow down the location at the floor level. For example, if the mobile robot determines that it is on the $8^{th}$ floor of a building, detailed local mapping or other stored sensor data for the elevator region at the $8^{th}$ floor may be used to determine the mobile robot's precise location.

Figure 6:
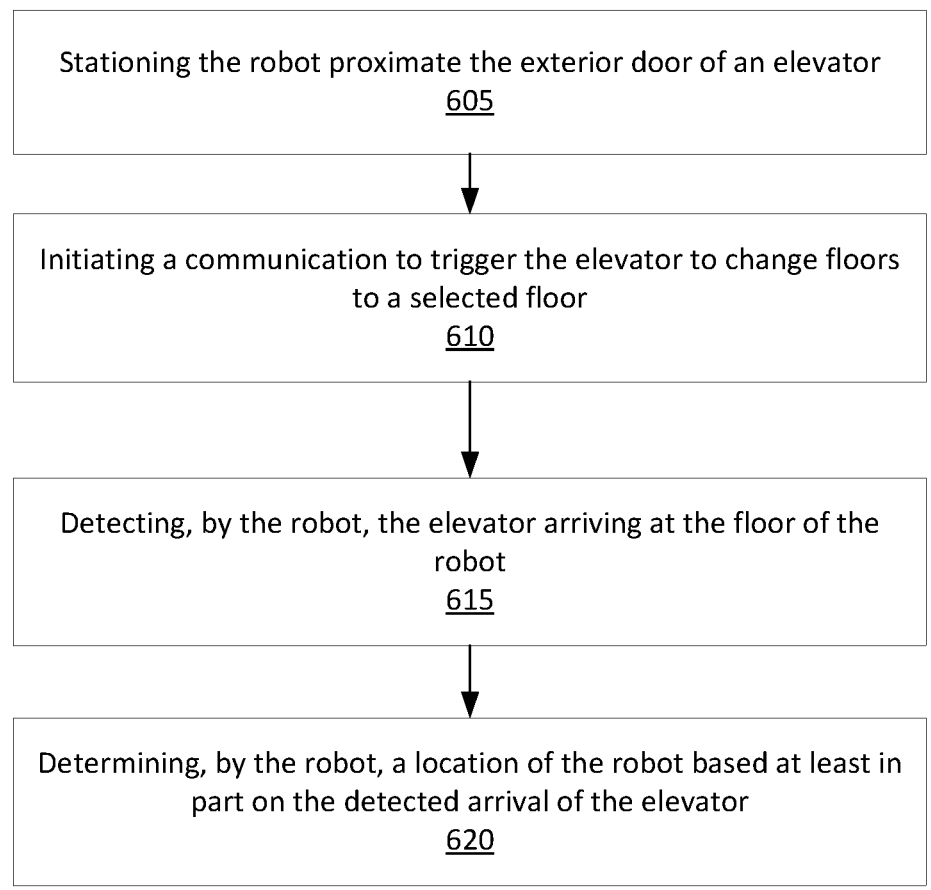
FIG. 6 is a flow chart of a method of recovering from a mislocalization error of a mobile robot by stationing a mobile robot outside the exterior doors of an elevator and initiating a change in a floor level of the elevator in accordance with an embodiment.

FIG. 6 is a flowchart of a method of recovering from a localization error in accordance with an embodiment. In block 605, the mobile robot is stationed proximate the exterior door of an elevator. As previously discussed, this could be performed manually, autonomously by the mobile robot, or via a teleoperator guiding the robot. In this example, if the floor of the mobile robot is unknown, then in block 610 a communication is made to the system controller 120 to trigger the elevator to change floors. This could be, for example, a command to move the elevator to a single floor or to move the elevator up or down to open at one or more floors in a selected sequence. In one embodiment, the mobile robot issues the command to the system controller to change the state of the elevator. However, it will be understood that in some embodiments, a human operator could issue the communication to trigger the elevator to change floors.

In block 615, the mobile robot detects the elevator arriving at the floor of the robot. As previously discussed, this may include using the sensors of the mobile robot to optically detect that the doors have opened. Other sensors, such as motion sensors, depth sensors, LIDAR, or RADAR, could also be used to confirm that the elevator doors have opened. Some elevators also give an auditory message or sound to indicate that the elevator has arrived, which could also be detected to confirm the arrival of the elevator.

In block 620, the mobile robot determines its location based at least in part on the floor information from the detected arrival of the elevator. For example, if the mobile robot initiates a communication to move the elevator car to the third floor and the mobile robot detects the opening of the elevator doors, then the mobile robot can conclude that the mobile robot is located near the elevator doors on the third floor. Alternatively, in some embodiments, the mobile robot could read the floor level of the elevator (via the system controller 120) after the elevator doors open to determine the floor level of the mobile robot. That is, after detecting the opening of the elevator doors proximate the mobile robot, the mobile robot could then read the floor level of the elevator car from the elevator controller as an additional source of information.

Figure 7A:
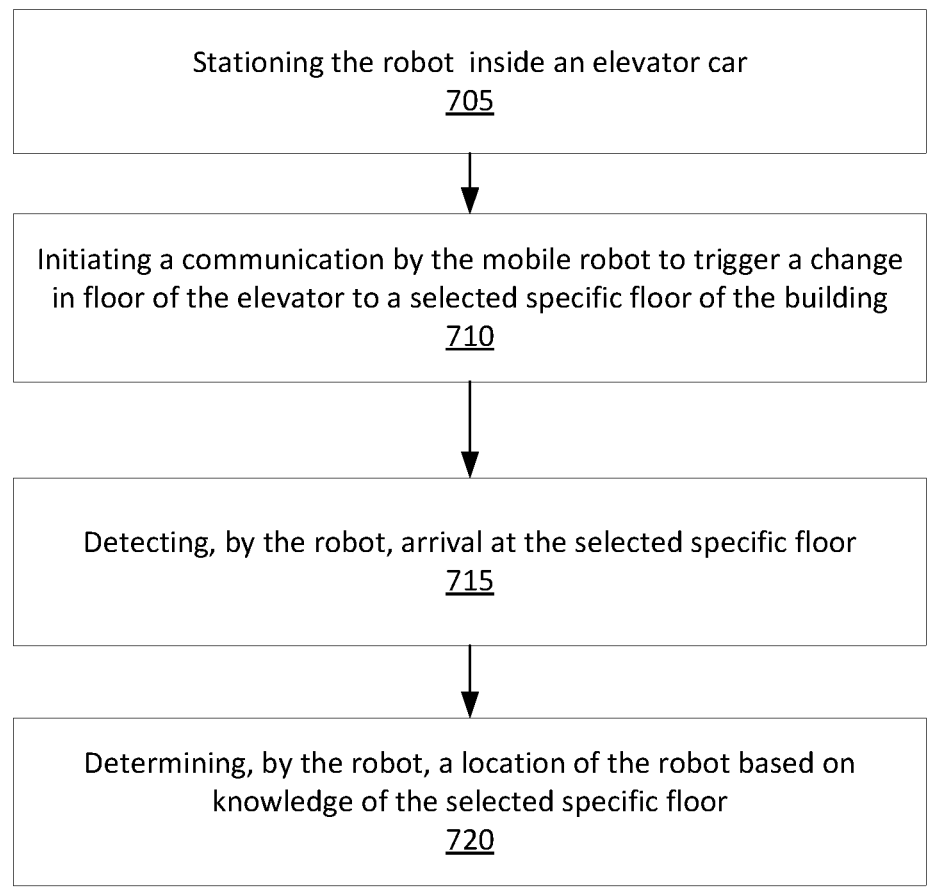
FIG. 7A is a flow chart of a method of recovering from a mislocalization error of a mobile robot by stationing a mobile robot inside an elevator car and initiating a change in a floor level of the elevator in accordance with an embodiment.

FIG. 7A is a flowchart of a method of recovering from a localization error. In block 705, the mobile robot is stationed inside an elevator car. For example, a human being may guide or push the robot into the elevator car, the mobile robot may autonomously navigate and enter the elevator car, or a teleoperator may guide the mobile robot into the elevator car.

In block 710, a communication is initiated by the mobile robot to send the elevator car, with the robot inside, to a specific floor in order to pin down the floor the elevator is on. This may be triggered by a human being (for example pressing a button, or remotely by a teleoperator) or be initiated automatically by the mobile robot in response to the mobile robot detecting that it has a localization error and is stationed in an elevator.

In block 715, the robot detects arrival of the elevator at the specific floor, such as by detecting the opening of the elevator doors or from feedback from the elevator controller.

In block 720, the robot then determines its floor level. This could be implemented in different ways. For example, a human user who stations the mobile robot inside the elevator car could enter the destination floor number in a user interface of the mobile robot. Alternatively, the mobile robot could detect the destination floor using its onboard sensors (e.g., detecting audio or visual clues generated locally by the elevator, such as indicator lights or sounds), or by communicating with the elevator controller to receive status information on the destination floor.

In one embodiment, the mobile robot can also use knowledge of its actual floor level to pull up the internal map of the specified floor. Additionally, in one embodiment mobile robot can also access any stored sensor scans and mapping information it has on known elevator regions to further limit its location to a precise location within an elevator region of a specific elevator of specified floor. In one embodiment, this includes detailed maps and/or sensor data in elevator regions. For example, the map may include a region inside and immediately outside the elevator car to aid in pinning down the robot's location once the floor level is known.

Figure 7B:
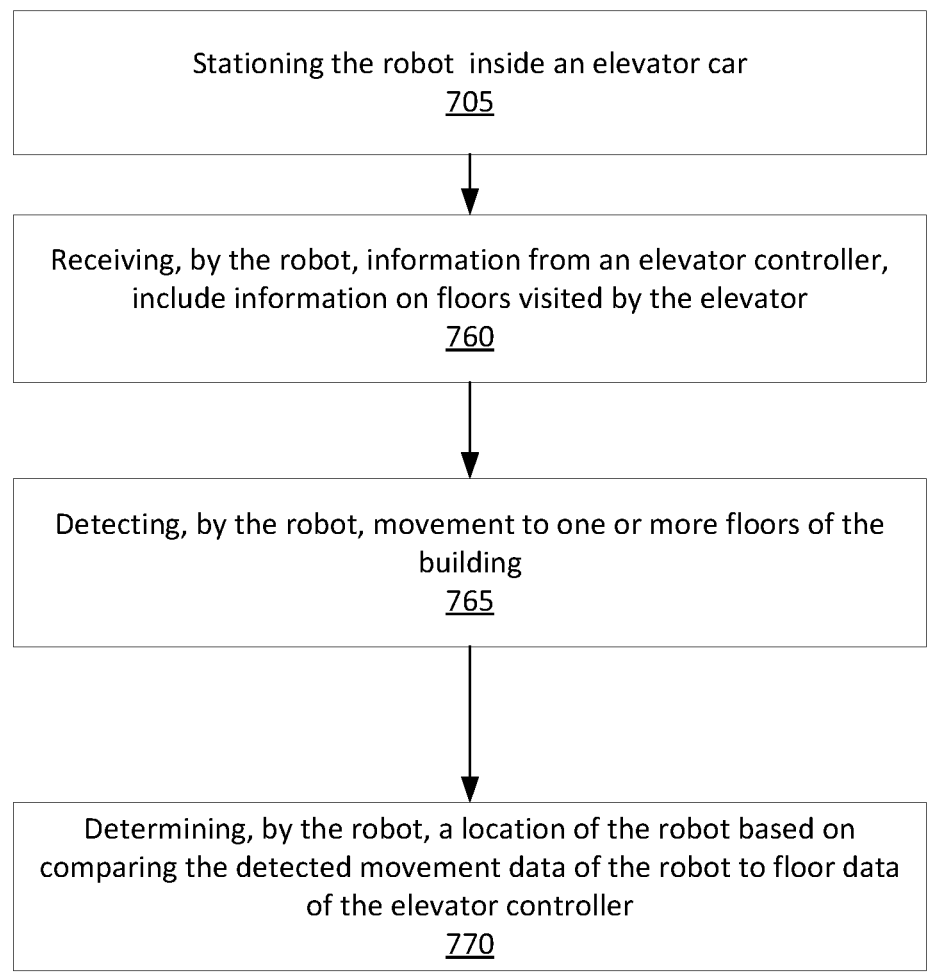
FIG. 7B is a flow chart of a method of recovering from a mislocalization error of a mobile robot in accordance with an embodiment.

FIG. 7B is a flowchart of a method of relocalization. In block 705, the mobile robot is stationed inside the elevator car. The elevator car is then commanded to move. This could, for example, be performed manually (e.g., a human being who stations the robot in the elevator presses buttons for one or more floors) or by a human being initiating a communication with the elevator controller to change the floor level. In block 760, the robot receives information from the system controller 120 that includes floors visited by the elevator. In block 765, the mobile robot detects its internal movement to one or more floors of the building. In block 770, the mobile robot determines its location by comparing the detected movement data to floor level data from the elevator controller.

It will be understood that many variations of the embodiment of FIG. 7B are possible. As examples, the stationing point may be either the elevator lobby or the elevator car. In some embodiments, the mobile robot is moved (e.g., pushed or otherwise guided) by staff to the stationing point if the mobile robot becomes lost. For example, if the stationing point is an elevator car, staff may push the mobile robot into the elevator car.

There are some practical advantages to using the elevator car as a stationing point. This is because it is often easier for a mobile robot to detect that it is in an elevator car and to detect which floor it is on. In contrast, in many applications it is more difficult if the stationing point is the elevator lobby for the mobile robot to determine what floor the elevator is on. For example, in some application scenarios a mobile robot stationed in an elevator lobby may have to discover which floor it is on by sending the elevator car to each floor until it notices an elevator door open.

In one embodiment, the stationing point is the elevator car and as previously discussed one option would be for staff to move (e.g., push or guide) the mobile robot into an elevator car. In one embodiment, the mobile robot supports automatic triggering of relocalization, based on sensor data, when the mobile robot becomes lost. In one implementation, the mobile robot's controller includes firmware or software code that implements a protocol to detect when the mobile robot is in an elevator car.

As one example, the mobile robot's sensor data may be read to check the dimensions of the room the mobile robot is in and a determination made by the mobile robot if the dimensions of the room matches one or more of the elevator cars of a building. In many buildings the dimensions of an elevator car are unique in that no other rooms of the building have exactly the same dimensions. However, optionally other aspects of the elevator car layout could be analyzed to verify a match. For example, even if a storage closet in a building had approximately the same overall dimensions as an elevator car, a storage closet would not have control panels, displays, and a door design similar to that of an elevator.

As another example, the mobile robot may determine that it is an elevator car based on detecting vertical motion or vertical acceleration. In many applications vertical motion or vertical acceleration outside of some limited range would not happen anywhere other than inside an elevator car. For example, even if a building include ramped walkways the vertical acceleration over such ramped walkways would be low compared with an elevator.

Also, it will be understood that a determination of whether or not a mobile robot is in an elevator car may be based on both matching a shape of a room to that of an elevator car and detecting vertical motion or vertical acceleration of the mobile robot.

In one embodiment, after the mobile robot detects that it is an elevator car, the protocol proceeds to performing automatic relocalization of the mobile robot. In one embodiment, this includes the mobile robot detecting upward or downward motion based on the accelerometer of the mobile robot and then using this information to determine a current location of the mobile robot. In one embodiment, the mobile robot monitors acceleration of the mobile robot and checks which elevator cars are a match in terms of an acceleration profile (upwards accelerations, downwards acceleration, or no acceleration). This would limit the selection of elevator cars that the mobile robot was on to a set of 1 or more candidate elevators having a matching acceleration profile. The mobile robot may determine which elevator car it is stationed in by a process of deduction using one or more steps of monitoring its acceleration and querying the elevator controller to detect matching acceleration profiles (with respect to vertical motion along the axis of the elevator shafts).

However, more generally relative motion profiles may be used (e.g., relative motion up or down such as moving up or moving down). For example, the mobile robot may use its accelerometer, timing information, and any other sensor information indicative of vertical movement to generate a relative motion profile indicative of whether or not the elevator car is moving up or moving down. If a relative motion profile is used by the mobile robot, it may determine which elevator car it is stationed in by a process of deduction using one or more steps of monitoring its relative motion and querying the elevator controller to detect matching relative motion profiles (with respect to vertical motion along the axis of the elevator shafts).

As an example, suppose that the mobile robot senses an upward acceleration of the mobile robot at some initial time, say at 4:32.01 PM. The mobile robot may then receive information from the elevator controller on which elevator cars were accelerating upwards at that time. For example, depending on implementation details, the mobile robot may continuously monitor the status of the elevators via the elevator controller or actively query the elevator controller to obtain status information. If only one elevator car was accelerating upward at time 4:32.01 PM, then the location of the robot has been limited to a single elevator car. However, suppose, as an example, that two elevator cars were accelerating upwards at 4:32.01 PM. There are thus in this example two candidate elevator cars. By performing additional monitoring of acceleration and checking the mobile robot could narrow down its location to a single elevator. For example, suppose that a building has 8 elevators and the elevator at time 4:32.1 has queried the elevator controller and has narrowed down its possible location to 2 of the 8 elevator cars. Suppose then at time 4:32.2 that the mobile robot again monitors its acceleration and checks with the elevator controller on the status of those 2 elevator cars. For example, if the mobile robot is not accelerating at time 4:32.1 and only one of the two candidate elevator cars is not accelerating then by deduction the mobile robot can determine which elevator car it is on. Once the mobile robot has limited its location to a single elevator car, it may use information from the elevator controller to determine which floor it is on.

In some implementations, there may only be a single elevator in a region of a building facility. For example, there may be a single elevator in some buildings. Alternatively, if the mobile robot can partially identify its location to within some maximum size region of a building or building facility (e.g., a wing of a building or one section of a hotel building). For example, there may be differences in the floor layouts of two different wings of a hotel. In this case if the mobile robot can at least partially limit its location to some maximum size region, then there may be a single elevator within the maximum size region. In this situation, a determination by the mobile robot that it is in an elevator car limits the location of the mobile robot to the single elevator. Alternatively, or in combination, the mobile robot may utilize a detection of vertical acceleration or vertical motion to infer that it is an elevator car. That may be enough in some situations to relocalize the mobile robot without receiving any information from the elevator controller or performing a matching of the motion profile of the elevator car to the mobile robot. For example, the mobile robot could read its internal map and determine that there is only one elevator with respect to a general region that the mobile robot is within (e.g., the entire building or a section of the building if the mobile robot can limit its location to a portion of a building). The mobile robot determines that it is an elevator car (by matching the shape of the room it is in to the shape of an elevator car and/or detecting vertical movement/acceleration of the mobile robot). The mobile robot can then combine this information to infer that it is located in a single elevator of the internal map.

While examples have been described in which the mobile robot performs the computations required to perform relocalization, it will be understood that in some alternate embodiments that one or more of the computational steps could be offloaded. For example, one or more computational steps could be offloaded to an external server or to a computer unit associated with the building controller or the elevator controller. For example, in some alternate embodiments the mobile robot could provide its sensor data to another entity (e.g., an external server or to a computer associated with the elevator controller or building controller) to perform at least some of the computations required for relocalization.

Additionally, once the mobile robot knows which car it's on, it can use other sensor data to determine its location within that elevator car based on the position of the walls of the elevator. As a result, the mobile robot discovers it precise location in the elevator car and its current floor. For example, after the mobile robot completes the relocalization process it may exit the elevator when the elevator doors open.

In the previous example, the relocalization process can be extremely passive in the sense of not necessarily requiring any direct control of the elevator car. For example, in some implementation, the mobile robot could be placed in an elevator car and then detect it is an elevator car and begin passively watching it own acceleration/relative movement and monitor the elevator status. Controlling the movement of the elevator cars, such as sending cars at random to different floors, is an optional additional step.

Figure 8:
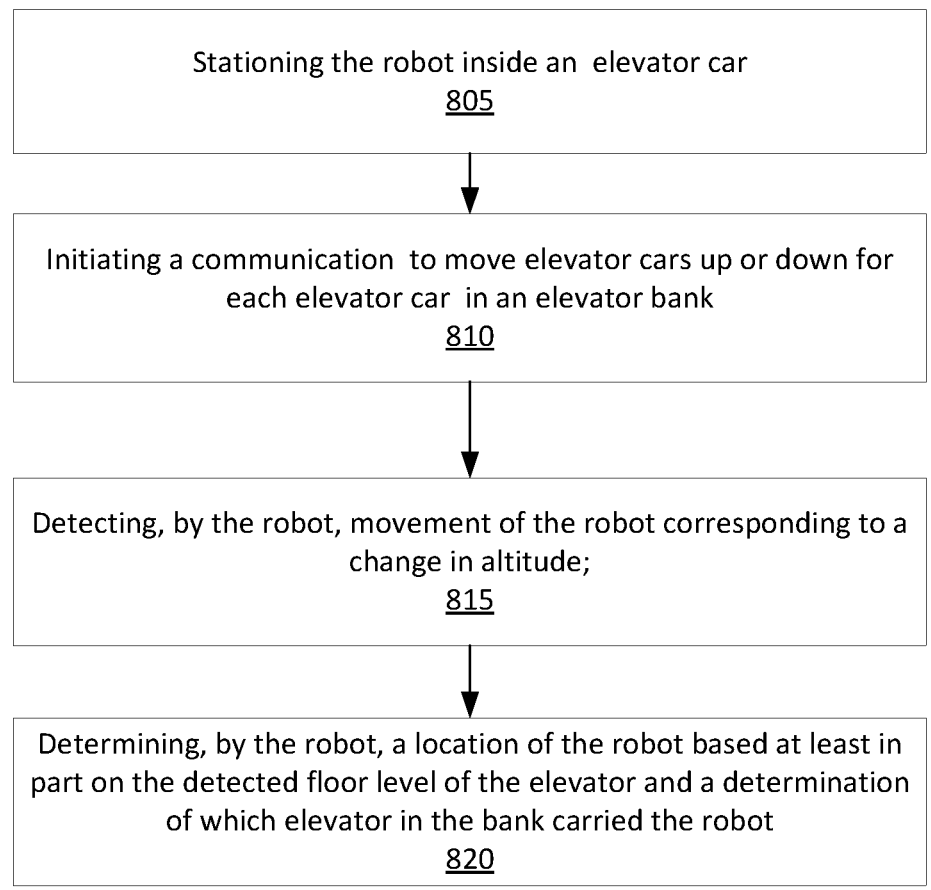
FIG. 8 is a flow chart of a method of recovering from a mislocalization error by detecting a change in state of an elevator in accordance with an embodiment.

FIG. 8 is a flowchart related to an elevator bank having multiple available cars, e.g., at least two available cars. For example, some very large buildings have elevator banks of 8 or more cars. For the situation of a very large elevator bank, determining a precise location of the mobile robot may, in some situations require knowledge not only of the floor the robot is on but a location corresponding to a specific elevator within the bank of elevators. To address this, in block 810 a communication is initiated by the mobile robot to move elevator cars up and down for each elevator car in the bank. In block 815, the robot's onboard sensors (e.g., altimeter and accelerometer), detect when the robot changes altitude. In block 820, the robot determines which car it was is in based on comparing the elevator's motion against the robot's sensed motion. This can be used to determine which elevator the robot is in within a bank of elevators. The final destination floor of that elevator gives the robot's current floor level. This information can be used along with sensor scans of the environment around the elevator bank to determine the location of the mobile robot on a known map.

Figure 9:
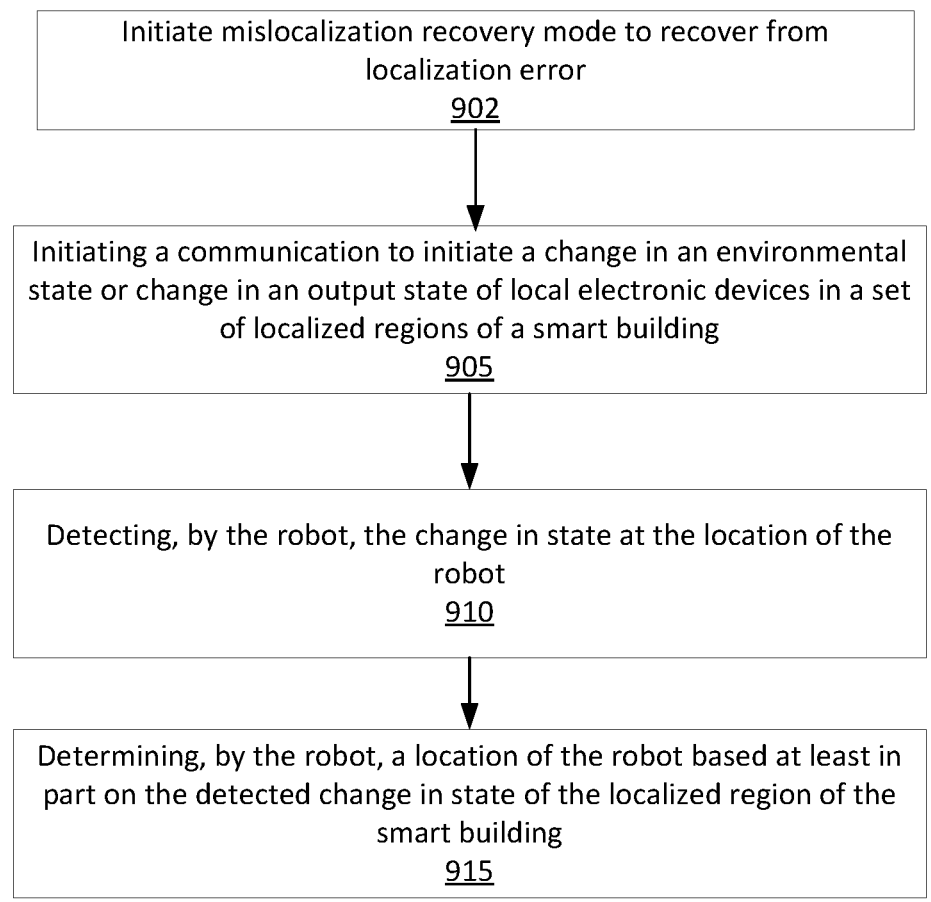
FIG. 9 is a flow chart of a method of recovering from a mislocalization error of a mobile robot by detecting a change in an environmental state or a change in an output of one or more electronic devices in a localized region of a building in accordance with an embodiment.

FIG. 9 illustrates a method of recovering from a mislocalization error in accordance with an embodiment. In block 902, a mislocalization recovery mode is initiated to recover from a localization error. In some embodiments, the mobile robot is stationed in a portion of the building in which an environmental state may be changed by the system controller 102 or in a location of the building in which the system controller 102 can change an output state of local electronic devices.

In block 905, the mobile robot initiates a communication with the system controller 102 to change an environmental state or an output of at least one electronic device in at least one localized region of a smart building. As an illustrative example, the mobile robot could initiate the communication to change a state of a HVAC or the lighting in a local region, such as in a room or floor of a building. As another example, the mobile robot could change an output of an electronic display in a local region, such as a display screen, computer display, or television. However, it will be understood that in alternate embodiment that a human operator could initiate the change in state of a local environmental state or output of an electronic device. For example, a teleoperator could generate commands to the system controller to vary local lighting conditions in a smart building.

In block 910, the mobile robot detects the change in state at the location of the robot. That is the mobile robot uses its sensors to detect the change in state proximate the mobile robot. In practice, a change in state of different local regions could be performed serially (e.g., changing a state in one local region, moving on to change the state in another local region, and so on). Alternatively, a set of local regions could be changed in parallel. For example, a set of rooms could each be assigned a different code, which is then embedded into variations in environmental conditions or the output of electronic devices in individual regions or rooms. For example, the room lights or other environmental conditions could be modulated with different codes in individual rooms. Additionally, it will be understood that the change in state could be conducted in stages at different levels of granularity from larger regions to smaller regions. For example, a change in state could be initiated first at a floor level for the mobile robot to determine the floor level of the robot. After the floor level is determined, then the change in state could be controlled at a room level for the mobile robot to zero in on the location of the mobile robot.

In block 915, the robot determines its location based at least in part on the detected change in state of the localized region that the robot is in.

Figure 10:
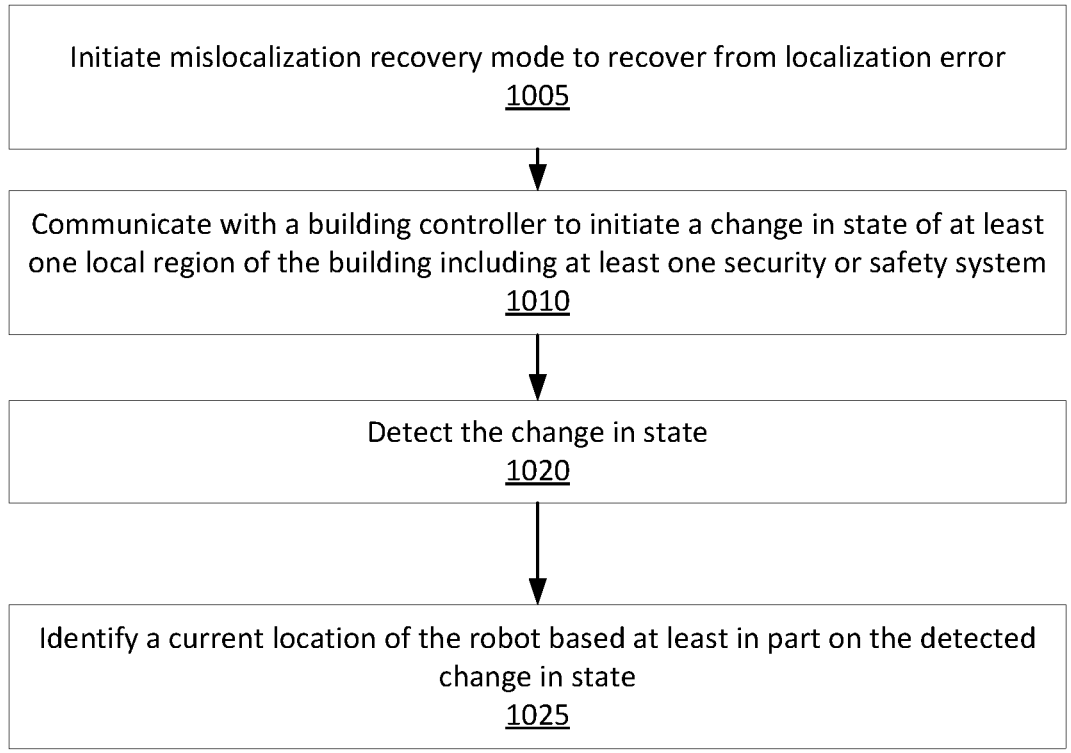
FIG. 10 is a flowchart of a method of recovering from a mislocalization error of a mobile robot by detecting a change in state of a local region of a building using available sensors or outputs from a building security and safety system in accordance with one embodiment.

FIG. 10 illustrates a method of recovering from a mislocalization error in accordance with an embodiment. In block 1005, a mislocalization recovery mode is initiated to recover from a localization error. In block 1010, the robot communications with the system controller of the building initiate a change in state of at least one local region of the building. In one embodiment, this may also include changes to a state of security and safety systems, such as modulating an output of emergency lighting, emergency exit signs, visual alarms, and audible alarms. In another embodiment, the change in state is a change in operation of cameras and microphones of a security and emergency system. For example, camera and microphones of a security or emergency system could be directed to monitor portions of the building for the mobile robot.

In block 1020, the change in state is detected. This may include detecting a modulation in an output of a portion of a safety or security system or detecting an output of the security system displaying a visual image or acoustic signature of the mobile robot.

In block 1025, the current location of the mobile robot is identified based at least in part in the detected change in state.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

While the embodiments above disclose various systems, devices and methods, additional methods will now be described with reference to a number of flow diagrams. Reference in the specification to "one embodiment", "some embodiments" or "an embodiment" means that a particular feature, structure, or characteristic described in connection with the embodiment is included in at least some embodiments of the disclosed technologies. The appearances of the phrase "in some embodiments" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of an entirely hardware implementation, an entirely software implementation or an implementation containing both software and hardware elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

What is claimed is:

1. A method for navigating a mobile robot comprising:
detecting a failure of the mobile robot to identify a location of the mobile robot on an internal map stored by the mobile robot;
detecting, by the mobile robot, a change in state of an environment proximate the location of the mobile robot, wherein the change in state is a change in state generated in a local region of a building initiated to provide location information to the mobile robot; and
identifying, by the mobile robot, a current location of the mobile robot on the internal map based at least in part on the detected change in state in the local region.

2. The method of claim 1, further comprising the mobile robot initiating a wireless communication with a building controller interface to initiate the change in state.

3. The method of claim 2, wherein the building controller is disposed in a location different than an elevator and wherein the mobile robot wirelessly receives elevator status signals from the building controller indicative of a floor level of the elevator, and the identifying comprises the mobile robot comparing sensor data of the mobile robot with the elevator status signals to determine the floor level of the mobile robot.

4. The method of claim 2, wherein the building controller is disposed in a location different than an elevator and wherein the mobile robot is stationed outside elevator doors of the elevator at a first floor level of the building initially unknown to the mobile robot, the change in state comprises moving the elevator to at least one other floor, the detecting comprises the mobile robot detecting the opening of the elevator doors at the first floor level, and the identifying comprises the mobile robot determining a floor level of the first floor level by comparing the detected opening of the elevator doors with at least one of issued elevator floor control signals and received elevator status signals associated with moving the elevator to the at least one other floor.

5. The method of claim 1, further comprising the mobile robot initiating the change in state by communicating with a building controller via a wireless network.

6. The method of claim 5, wherein the mobile robot communicates with the building controller to initiate a change in state of an elevator, the detecting comprises the mobile robot detecting a change in state of the elevator based at least in part on sensor data of the mobile robot, and the identifying comprises the mobile robot identifying a current floor level of the mobile robot based at least in part on the detected change in state of the elevator.

7. The method of claim 1, wherein the change in state is a change in at least one of a local temperature, a local fan speed, and a local lighting condition.

8. A mobile robot, comprising:
a navigation system including at least one processor and an internal map stored on a memory accessible by the navigation system;
the navigation system including computer program instructions to:
determine a location of the mobile robot on the internal map;
recover from a localization error that is identified in response to the mobile robot being unable to identify a location of the mobile robot on the internal map:
detect a change in state in a region of a building proximate the mobile robot, wherein the change in state is a change in state generated in a local region of the building initiated in response to the mobile robot wirelessly communicating with a building controller; and
identify a current location of the mobile robot based at least in part on the detected change in state in the local region.

9. The mobile robot of claim 8, wherein the change in state comprises a change in state of an elevator.

10. The mobile robot of claim 9, wherein the change in state comprises a change in a floor level of the elevator.

11. The mobile robot of claim 8, wherein the change in state is a change in at least one of a local environmental condition or an output of a local electronic device.

12. The mobile robot of claim 8, wherein the mobile robot comprises a wireless communication interface, the change in state is a change in state of an elevator, and the mobile robot communicates with a building controller to initiate a change in state of the elevator and receive elevator status information.

13. A mobile robot system, comprising:
a mobile robot including:
a drive mechanism;
a sensor system;
a navigation system including a processor, at least one internal map stored on a memory, navigation sensors and computer program instructions to
recover from a localization error in response to a determination that the mobile robot is unable to identify a location of the mobile robot on the at least one internal map, the computer program instructions, when executed on the processor, implementing a method to:
access sensor data of the mobile robot;
communicate via a wireless network with a building interface of a building controller to trigger the building controller to initiate a change in state of at least one local region of the building and provide status information on the state of at least one local region of the building;
detect a change in state in a local region of a building proximate the mobile robot based at least in part on sensor data of the mobile robot; and
identify a current location of the mobile robot based at least in part on the detected change in state of the local region.

14. A method for mobile robot navigation, comprising:
detecting a localization error in which the mobile robot is unable to identify its location on an internal map of the mobile robot;
determining that the mobile robot is in an elevator car;
monitoring at least one of a robot accelerometer and a robot altimeter;
detecting, based on the monitoring, at least one of an elevator car acceleration profile and a relative motion profile;
receiving, from a building controller, at least one of an elevator car acceleration status or relative motion status information for a set of elevators; and
identifying an elevator car having an acceleration profile or relative motion profile matching that of the mobile robot; and utilizing the identified elevator car to limit the location of the mobile robot on the internal map to a specific elevator car.

15. The method of claim 14, wherein the determining comprises the mobile robot identifying that is located in an elevator car based at least in part by detecting a match between dimensions of a room the mobile robot is located in and the dimensions of one or more elevator cars in a building.

16. The method of claim 14, wherein the determining comprises the mobile robot detecting vertical motion of the mobile robot.

17. The method of claim 14, wherein the monitoring, receiving, identifying, and utilizing are performed by the mobile robot.

18. The method of claim 14, wherein at least one of the monitoring, receiving, identifying, and utilizing is performed by an entity other than the mobile robot.

19. A method for navigating a mobile robot, comprising:
- detecting a localization error in which the mobile robot is unable to identify its location on an internal map;
- determining, by the mobile robot, that it is in an elevator car including at least one of: 1) determining a match between dimensions of a room the mobile robot is located in and the dimensions of an elevator car and 2) detecting vertical motion of the mobile robot;
- identifying, by the mobile robot, that there is a single elevator within a largest possible region that the mobile robot is located within with respect to the internal map; and
- limiting the location of the mobile robot on the internal map to the single elevator based on determining that the mobile is in an elevator car within the region having the single elevator.

20. The method of claim 19, wherein the region is a building.

21. The method of claim 19, wherein the region is portion of a building.

* * * * *